March 5, 1968

W. C. KAERCHER, JR 3,371,495

CONDUIT EMBEDDING MACHINE

Filed Oct. 22, 1965

INVENTOR.
WILLIAM C. KAERCHER JR.
BY
Meyers & Peterson
ATTORNEYS

March 5, 1968 W. C. KAERCHER, JR 3,371,495
CONDUIT EMBEDDING MACHINE
Filed Oct. 22, 1965 3 Sheets-Sheet 2

INVENTOR.
WILLIAM C. KAERCHER Jr.
BY
Meyers & Peterson
ATTORNEYS

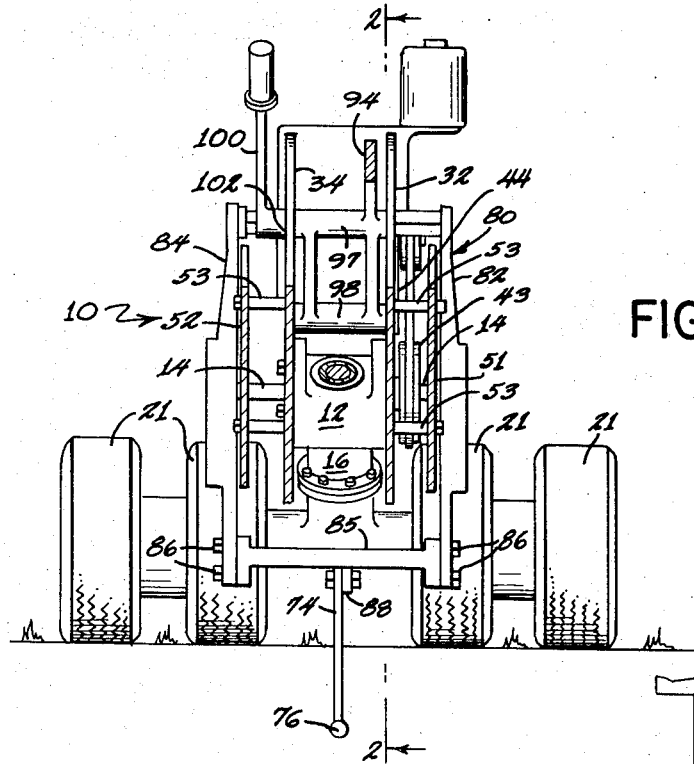

United States Patent Office 3,371,495
Patented Mar. 5, 1968

3,371,495
CONDUIT EMBEDDING MACHINE
William C. Kaercher, Jr., Minneapolis, Minn., assignor to Gamma, Inc., Minneapolis, Minn., a corporation of Minnesota
Filed Oct. 22, 1965, Ser. No. 501,103
18 Claims. (Cl. 61—72.7)

ABSTRACT OF THE DISCLOSURE

A pair of oscillatory arms are suspended from a shaft mounted on a wheeled chassis. An eccentric bearing assembly, one for each arm, is rotated between forwardly and rearwardly spaced cam blocks on the arms so as to impart oscillatory motion to said arms. A thin blade extends vertically downwardly from a transverse stress bar and has integrally affixed to its lower end a tunnel-forming member. A flexible cable extends rearwardly from the tunnel-forming member and connects with the conduit to be embedded in the ground. The arms, together with the vertical blade and the tunnel-forming member, can be raised by reason of the vertical movement made possible by the eccentric assembly and the spaced cam surfaces against which the eccentric assembly bears when imparting oscillatory motion to the arms.

---

This invention relates to a machine for embedding flexible conduit such as pipe or cable or the like beneath the surface of the ground without first preparing a trench to receive the conduit. More particularly, the invention pertains to an embedding machine which forces a vertically disposed knife through the ground, the conduit being attached to the knife at a predetermined depth beneath the surface and being drawn or towed longitudinally through the ground by the forward motion of the knife.

The machine of the present invention is intended for use in placing flexible pipe, such as electrical conduit, sprinkler pipe, gas pipe or the like, beneath a lawn or other ground surface without marring the surface of the ground. To this end, the vertical knife blade of the machine is introduced into the ground to the desired depth and is forcibly oscillated back and forth as the machine is propelled forward to open a path for the conduit which is being laid. This combination of constant and intermittent pulling forces permits extremely long lengths of flexible pipe to be drawn through the ground with much less power than would be required with a constant draw. Moreover, the traction between the drive wheels and the ground is relied on to a lesser extent with this arrangement so that there is less chance of tearing the turf with the drive wheels.

It is an object of this invention to provide an improved conduit embedding machine of the character described which is of relatively small size and of compact design so that it may be used efficiently to bury flexible conduit where access and operational clearances may be limited, such as at housing sites. In this respect, the machine is of such size and weight that it may be easily manipulated in and out of established yards as well as the area of new construction.

It is another object of the invention to provide a conduit embedding machine having a combined propelling drive system and oscillating system for the ground knife thereof. Again, the features of compactness and ruggedness are involved, since each of the drives requires for maximum efficiency that a minimum number of parts and a minimum of lost motion be involved.

It is still another object of the invention to provide a conduit embedding machine of the class described which is efficient in operation and easy to handle, so that it may be manipulated by a single operator. This object is achieved by constructing the machine and the improved oscillating drive mechanism thereof in such a way that the knife may be withdrawn from ground engaging relation and its motion stopped without interfering with the ability of the machine to be propelled forward under its own power. Thus with this arrangement, the machine may be easily loaded and unloaded from a transporting means such as a truck or trailer and can be maneuvered to and from the job sites without difficulty. The machine is constructed to be well balanced for easy handling, but is still heavy enough to provide good traction and to hold the ground knife in place under even abnormal soil conditions.

Still another object of the invention is to provide an improved oscillatory drive mechanism for a pipe and cable embedding machine of the class described in which the moving parts are provided with bulit-in compensation for various misalignment conditions which may occur in manufacture. By means of this compensation, undue strain on the various precision parts is avoided and the useful lifetime of the machine is thereby increased.

Briefly, the invention comprises a wheeled chassis capable of traversing the ground. Oscillatory arms are actuated forwardly and rearwardly in a swinging manner so as to impart impact forces via a downwardly extending blade which carries an integrally fixed tunnel-forming member at its lower end. Attached to the tunnel-forming member is a conduit that is to be embedded in the ground. By means of a rotatable eccentric bearing assembly that is power driven and a pair of spaced cam surfaces mounted on each arm, the arms are actuated in a forward and reverse direction, a pivot shaft being located on the chassis above the eccentric assembly. The entire machine is provided with forwardly positioned wheels that serve as a pivotal axis about which the machine can be tilted to raise the tunnel-forming member above the ground. A bumper bar then engages the ground, but as the machine is pulled rearwardly toward the operator who walks behind during the laying procedure, the tunnel-forming member is directed into the ground and in this way pulls the conduit that is to be embedded.

Other objects, advantages and new features of the invention will become apparent from the following detailed description of a preferred embodiment thereof, when read in conjunction with the accompanying drawings wherein:

FIGURE 3 is a transverse vertical section through the machine taken generally on the line 3—3 of FIGURE 1;

FIGURE 6 is a partial detail showing, in elevation, of the eccentric drive portion of the machine; and FIGURE 7 is a partial cross-section through the eccentric drive portion of the machine, illustrating certain details thereof.

Figure 1:
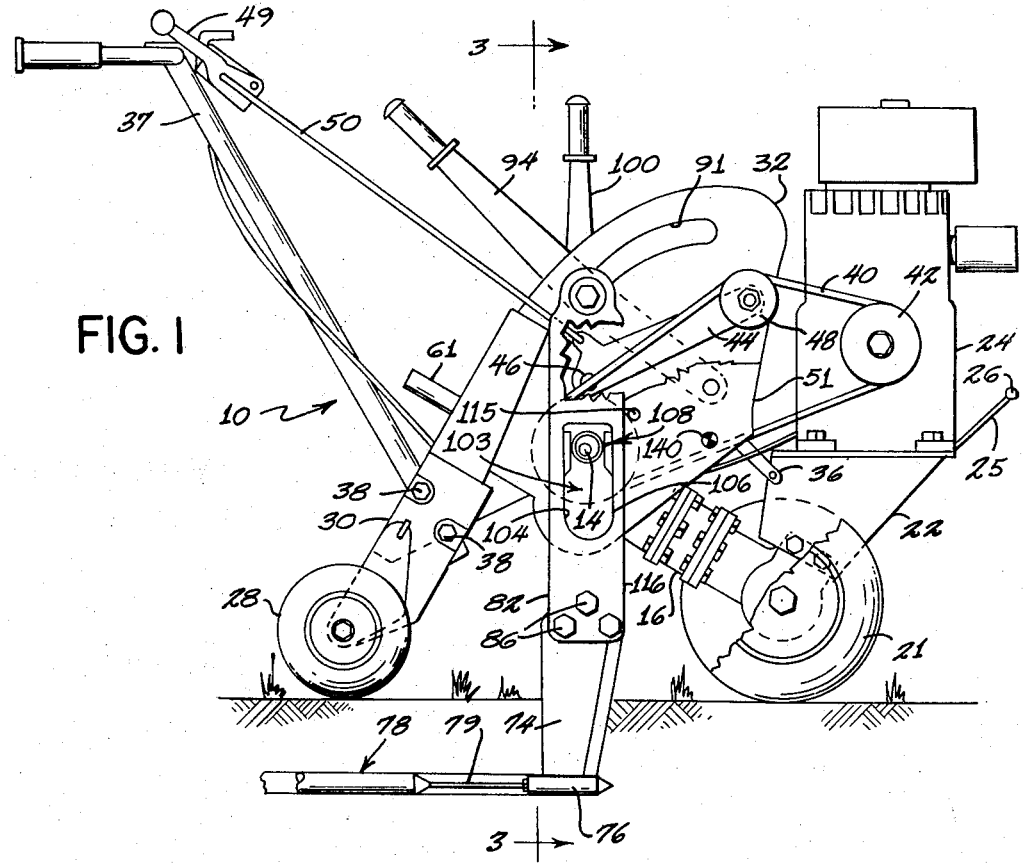
FIGURE 1 is a side elevational view of a machine according to the invention, showing the knife and tunnel-forming elements in their operative position.

The machine according to the invention is generally indicated at 10 throughout the several views of the drawings. As shown, the machine 10 has a wheeled chassis 11 which is built up of the various parts of the machine as follows. The central core of chassis 11 is a transmission housing 12. As will appear more fully hereinafter, the transmission housing 12 provides a journal for a power driven shaft 14 which operates the oscillating drive portion of the mechanism, as well as for a main drive shaft 15 in the propelling drive portion of the mechanism. A main drive shaft housing 16 of tubular form extends downwardly and forwardly from transmission housing 12 and terminates in a gear case 18, in which is journaled the front axle 20 of the front drive wheels 21. The gear box 18 also provides support for a motor mounting bracket 22 on which is mounted a gasoline engine 24 which provides the motive power for the machine.

The forward portion of the machine also carries a bracket 25 and a transverse bar 26 which acts as a bumper and also provides support for the machine when it is tilted forwardly around the axis of the wheels 21, for a purpose which will be later described.

At the rear of the chassis 11, support is provided by a pair of rear wheels 28. Wheels 28 are supported by a pair of legs 30 and 31 which are in turn fixed to a pair of flat parallel journal plates 32 and 34 which are bolted to the opposite sides of the transmission case 12 as best shown in FIGURE 3. For added support, the journal plates 32 and 34 are connected to the front bracket 22 by means of strips 36. For steering the machine, a control handle 37 is fixed between the two legs 30 and 31 by suitable bolts 38 as shown.

A belt drive is provided for rotating the transverse power driven shaft 14. This belt drive consists of a belt 40 connecting the output pulley 42 of the motor 24 to a driven pulley 43 fixed on the shaft 14. A belt tensioning mechanism is provided so that the output of motor 24 may be selectively applied to the shaft 14, this belt tensioning mechanism consisting of a lever 44 pivotally mounted on the journal plate 32 on a suitable pivot pin 46. The lever 44 carries an idler pulley 48 at its outer free end and is actuated by a suitable lever 49 mounted on the handle means 37 and connected to the lever 44 by means of a link 50. A guard plate 51 covers the moving parts. It and a similar plate 52 on the opposite side of the machine are mounted on plates 32 and 34 by spacer bolts 53.

Figure 5:
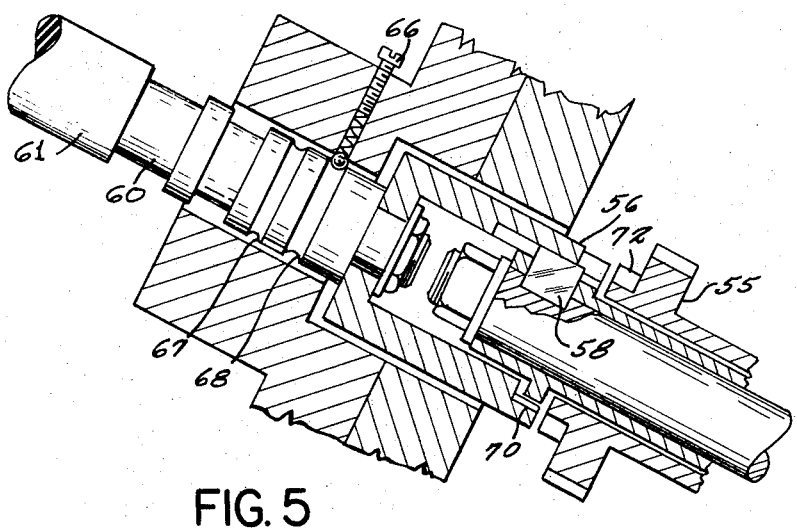
FIGURE 5 is a detailed showing taken on the line 5—5 of FIGURE 4.
Figure 4:
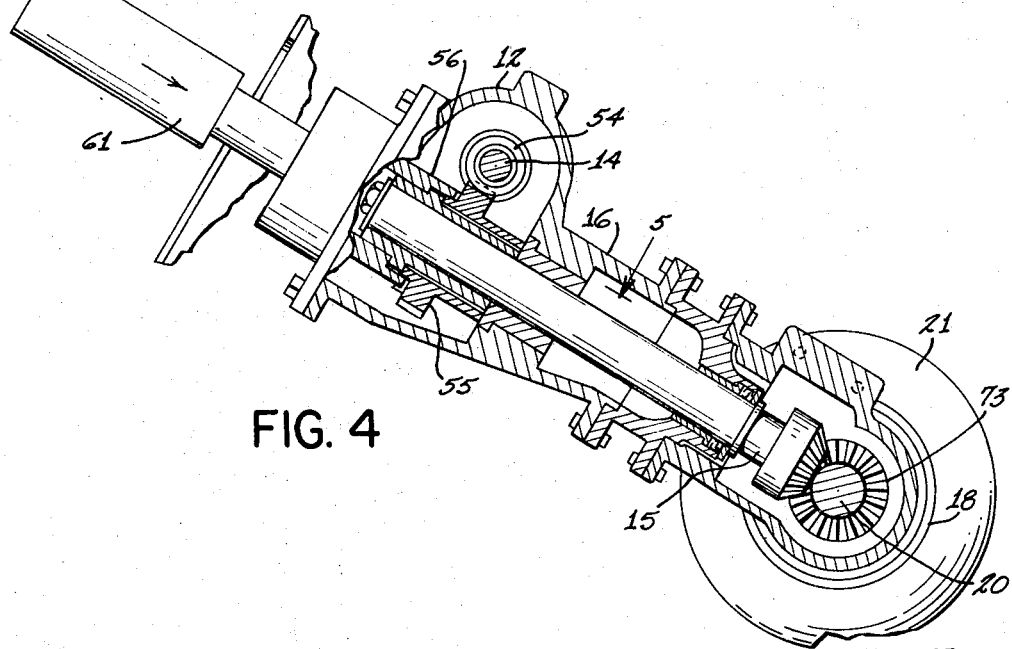
FIGURE 4 is a partial cross-section showing the propelling drive portion of the mechanism.

Rotation of shaft 14 is transmitted to the driving wheels 21 by means of a drive train best illustrated in FIGURES 4 and 5. Referring to FIGURE 4, it will be seen that the main drive shaft 15 can be selectively coupled to the shaft 14 so that the forward motion of the machine can be stopped without stopping the rotation of shaft 14. A worm 54 fixed on shaft 14 engages a worm wheel 55 which is rotatably mounted on the shaft 15, the worm continuously rotating the worm wheel when the belt tensioning mechanism is engaged. For transferring the rotation of the worm wheel 55 to the shaft 15, the dog clutch element 56 is mounted in the housing 12 for both rotary and axial reciprocating movement. The clutch element 56 is secured to shaft 15 for rotation therewith by means of a key 58 and is rotatably mounted on an actuating shaft 60 which is provided at its outer end with a handle 61. A ball detent 66 is provided which co-operates with two grooves 67 and 68 to define the clutch engaged and disengaged positions of shaft 60. It will be apparent that when shaft 60 is forced inwardly the clutch teeth 70 on the clutch element 56 will be brought into engagement with the clutch teeth 72 on the worm wheel 55 to effectively couple the worm wheel 55 to the shaft 15 through the key 58. When the shaft is pressed inwardly, ball detent 66 will enter the groove 67 to aid in holding the shaft in its inward engaged position. The engaged condition of the clutch is illustrated in FIGURE 4.

At its lower end, drive shaft 15 is coupled to the front axle 20 through a set of bevel gears 73. Any reduction in speed which may be desired can be accomplished here. Moreover, it will be appreciated by those skilled in the art that while a direct drive is shown, a differential may be employed in place of the gearing 73, if desired, to facilitate steering of the machine by permitting independent movement of the drive wheels 21. As another alternative to facilitate steering of the machine, the drive wheels 21 may be mounted on the axle 20 by means of overrunning clutches so that they may be rotated independently of each other.

The rotation of power driven shaft 14 is also employed to actuate the ground engaging parts of the machine, including a knife 74 which, as stated above, is adapted to be inserted into the ground to a predetermined depth and forcibly moved through the ground by the combination of the forward motion of the machine and an oscillatory or reciprocating motion. The knife 74 carries a tunnel-forming element 76 to open a path for the conduit which is being embedded, the conduit being indicated generally at 78 in FIGURE 1. The conduit 78 is attached to the tunnel-forming element 76 by a length of flexible cable or the like 79 so that any net rearward movement of knife 74 will not be transmitted to the conduit.

Referring now to FIGURE 3, it will be seen that the knife 74 is supported on a U-shaped carriage 80, which is made up of the two side arms 82 and 84 and the transverse stress bar 85 connected between the lower ends of the arms by suitable bolts 86. As shown, the knife 74 is bolted to a downwardly extending flange 88 on the stress bar 85 intermediately of the side arms 82 and 84. Preferably, the knife is mounted at the center of the stress bar, since this construction centers the reaction loads which will be imposed on the machine as the knife passes through the ground so that there will be less tendency for the machine to tilt or to turn to the side.

Figure 2:
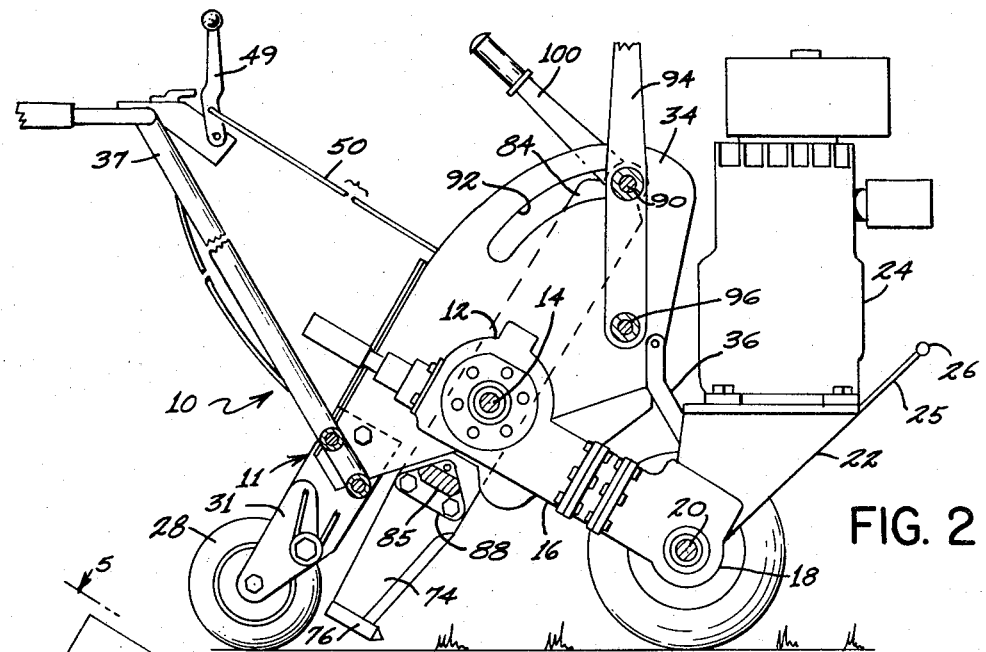
FIGURE 2 is a section taken on a fore and aft vertical plane through the machine, as indicated by the line 2—2 of FIGURE 3.

The knife supporting carrier 80 is pivotally mounted on the chassis 11 for oscillatory motion about a horizontal transverse axis. The rotation of shaft 14 is transferred to the carrier 80 by means of an eccentric drive mechanism which also permits the entire carier to be lifted upwardly for a substantial distance so as to be able to withdraw the knife 74 from ground engaging relation without compromising the ability of the machine to travel under its own power. For pivotally supporting the carrier 80, the upper ends of the side arms 82 and 84 are journaled on a transverse axle 90 which appears in cross-section in FIGURE 2.

The axle 90 passes through a pair of parallel arcuate slots 91 and 92 in the side plates 32 and 34 respectively, the slots 91 and 92 extending upwardly and forwardly from a terminus lying directly above the power driven shaft 14 to another point which lies forwardly and above the first point. For moving the axle 90 within the slots 91 and 92, a lever 94 is provided which is journaled between the plates 32 and 34 on a fixed transverse shaft 96. As seen in FIGURE 3, the lever 94 has a generally frame-like construction between the plates 32 and 34, having a tubular portion 97 in which axle 90 is journaled and a tubular portion 98 journaled on shaft 96. The axis of shaft 96 is coincident with the center of curvature of the slots 91 and 92 so that rotation of the lever 94 about shaft 96 will also serve to move the axle 90 within the slots. A limited amount of adjustment of the depth of penetration of knife 74 is also provided by moving axle 90 in the slots.

Means are provided for locking the axle 90 in any desired position, this locking means being of conventional construction as suggested by the lever 100 journaled on the shaft 90 on the left side of plate 34. This lever may actuate a cam-type friction locking mechanism indicated generally at 102 for frictionally holding the carrier 80 in place.

The carrier oscillating mechanism is illustrated generally in FIGURE 1 and in detail in FIGURES 6 and 7. The drive engages each of the arms 82 and 84 and forces them backward and forward simultaneously, but, for purposes of convenience and clarity, only the mechanism which engages arm 82 is shown in the drawings. It will be understood that the mechanism on the opposite side of the machine at arm 84 is the same.

As shown in FIGURE 1, the arm 82 has an elongated slot 103 having parallel side walls 104 and 106 respectively. An eccentric bearing assembly 108 is mounted on the end of power driven shaft 14 and lies within the slot 103 between the walls 104 and 106 as indicated best in FIGURE 7. When the transverse axle 90 is positioned directly above the power driven shaft 14, the bearing assembly 108 is embraced by a pair of cam surfaces 109 and 110 on a pair of cam blocks 112 and 114 fixed to walls 104 and 106, respectively. The length of the cam blocks 112 and 114 is selected such that when the lever 94 is actuated to raise the carrier 80 to its upper position, the bearing surfaces 109 and 110 will be brought out of engagement with the bearing assembly 108 so that the bearing assembly will lie in the larger portion of the slot and its motion will not be transmitted to the arm 82. To aid in holding the arm out of contact with the bearing assembly 108 in its upward position, a pin 115 is fixedly mounted on the outer guard plate 51, and it will be apparent from a consideration of FIGURE 1 that when the carrier is raised the outer surface 116 of arm 82 will ride up onto pin 115 and rest thereon.

It should be noted at this point that the construction of chassis 11 is such as to provide sufficient clearance to accommodate the transverse stress bar 85 when the carrier 80 is raised to its upper position. It will be understood that the depth of penetration of knife 74 is substantial, a depth between 5 and 7 inches being common. For this reason, a rather large amount of clearance is required to accommodate the parts when the carrier is raised, and the unique construction of the chassis as well as the manner in which the carrier is tilted forwardly in addition to being raised provides for getting the knife out of the ground while still maintaining the compact nature of the machine.

Attention is now directed to FIGURES 6 and 7 for a disclosure of the details of construction of eccentric bearing assembly 108, this assembly having certain features which cooperate with the other elements of the machine to insure the operability and useful lifetime of the machine. As illustrated in FIGURE 7, the end of power driven shaft 14 is machined to provide an eccentric shaft 118, bearing assembly 108 being mounted on shaft 118 so as to be eccentrically mounted on shaft 14. Bearing assembly 108 consists of a needle roller bearing having an inner race 120 and an outer race 121 supported on suitable needles 122. The inner race 120 is mounted on a bushing 124, which is in turn mounted on a sleeve 126 on the eccentric shaft 118. The parts are retained on eccentric shaft 118 by means of a nut 127 threaded onto shaft 118 and suitable washers 128 and 130.

It will be noted in FIGURE 7 that the outer peripheral surface 132 of outer race 121 is transversely crowned to present a convex surface to the cam surfaces 109 and 110. This crowning compensates for any lack of parallelism which may exist between the cam surfaces 109 and 110, and between these surfaces and the axis of shaft 14. It will be appreciated that it is seldom possible to establish absolutely parallel surfaces in a machine, and that if the outer periphery of the outer race 121 were in flat engagement with the cam surfaces, then twisting and uneven pressure on the roller elements 122 would occur. The net result of this would be overheating and a materially decreased lifetime of the parts.

FIGURE 7 also illustrates a lubrication system for supplying grease or other lubricant to the needle rollers 122 as well as to the cam surfaces 109 and 110. For this purpose, a grease fitting 133 is provided on the end of eccentric shaft 118, this grease fitting communicating through suitable bores with a lubricant groove 135 in the shaft 118. Suitable openings of conventional form through the sleeve 126, the bushing 124 and the inner race 120 supply grease from the groove 135 to the rollers 122. In addition, the outer race 121 is drilled through to provide a plurality of radial bores 136 for supplying grease from the vicinity of the rollers to the cam surfaces 109 and 110. Thus, the entire assembly may be lubricated by applying a grease gun to the fitting 133 at periodic intervals.

In operation, the machine is brought to the point where the run of conduit is intended to start and there is tilted forwardly about the front axle 20 until the bumper bar 26 is in engagement with the ground to support the machine. It will be understood that the position of motor 24 and the arrangement of the other parts of the machine is such that the center of gravity lies at approximately the point 140. This point lies behind the axis of the front wheels when the rear wheels 28 are in engagement with the ground and lies forwardly of the front wheel axis when the machine has been tilted forwardly as described. With the machine tilted forwardly, the cable to be laid is attached to the tunnel-forming member 76 and the embedding process can then begin.

Clamping lever 100 is now operated to loosen the axle 90, and lever 94 is moved to bring the knife supporting carrier 80 into its operative position. The motor 24 is now started if it is not already running and the lever 49 is actuated to raise the belt tensioning lever 44 and start the oscillatory movement of the carrier 80 and the forward motion of the machine. At the same time, the machine is tilted backwardly over the axis of the front axle 20 so that the knife 74 enters the ground. The combination of the tilting action and the beginning of the forward motion brings the knife 74 into the ground in an arcuate path so that the conduit may follow smoothly. After the wheels 28 have been brought back into engagement with the surface of the ground and knife 74 has penetrated the ground to the full extent desired, the machine is then manipulated over the desired path until the entire length of conduit has been laid.

The machine, according to the described embodiment, fully meets the objects of the invention set forth hereinabove. It can readily be transported to and from the job site under its own power, simply by raising the carrier 80 to the upper position. Moreover, the machine is compact, efficient in operation and, because of the unique elements of its construction, will have an extended useful lifetime.

It is to be understood that within the scope of the appended claims, the invention may be practiced otherwise than herein specifically described.

I claim:

1. A machine for embedding flexible conduit or the like beneath the surface of the ground comprising a wheeled chassis adapted to be moved along the surface of the ground, a knife supporting carrier mounted on said chassis, said carrier having a generally vertical arm disposed on each side of said chassis and a transverse stress bar connected between the lower free ends of said arms and extending beneath said chassis, a vertically disposed knife secured to said stress bar intermediately of said arms, said knife being adapted to enter the ground to a predetermined depth, an elongated tunnel-forming member fixedly carried at the lower end of said knife to open a path, flexible means extending rearwardly from said tunnel-forming member for connection to said conduit and to tow said conduit through the path opened by said tunnel-forming member, means defining a transverse axis on said chassis, said carrier being pivotally mounted on said axis means for powered oscillatory movement about said axis, said axis-defining means being movable on said chassis between one position in which said knife and tunnel-forming member are in ground engaging relation and another position in which said knife and tunnel-forming member are raised clear of the ground, said chassis having sufficient ground clearance to accommodate said stress bar, said knife and said tunnel-forming member in the raised position of said carrier, and means for oscillating said carrier including a power driven shaft journalled in said chassis, eccentric means fixed on said shaft to be rotated thereby and a cam surface on said carrier positioned forwardly of said power driven shaft when said knife and tunnel-forming member are in ground engaging relation, said surface being adapted to be engaged by said eccentric means to aforesaid knife and tunnel-forming member intermittently against the resistance of the ground.

2. A conduit embedding machine as defined in claim 1, wherein said eccentric means is a needle roller bearing assembly having an inner race mounted eccentrically on said shaft and an outer race having a peripheral surface adapted to engage said cam surface.

3. A machine for embedding flexible conduit or the like beneath the surface of the ground comprising a wheeled chassis adapted to be moved along the surface of the ground, a knife supporting carrier mounted on said chassis, said carrier having a generally vertical arm disposed on each side of said chassis and a transverse stress bar connected between the lower free ends of said arms and extending beneath said chassis, a vertically diposed knife secured to said stress bar intermediately of said arms, said knife being adapted to enter the ground to a predetermined depth to open a path and to tow said conduit therethrough, means defining a transverse axis on said chassis, said carrier being pivotally mounted on said axis means for powered oscillatory movement about said axis, said axis-defining means being movable on said chassis between one position in which said knife is in ground engaging relation and another position in which said knife is raised clear of the ground, said chassis having sufficient ground clearance to accommodate said stress bar and knife in the raised position of said carrier, and means for oscillating said carrier including a power driven shaft journalled in said chassis, eccentric means fixed on said shaft to be rotated thereby and a cam surface on said carrier positioned forwardly of said power driven shaft when said knife is in ground engaging relation, said cam surface being adapted to be engaged by said eccentric means to force said knife intermittently against the resistance of the ground, said eccentric means being a needle roller bearing assembly having an inner race mounted eccentrically on said shaft and an outer race having a peripheral surface adapted to engage said cam surface, said cam surface being flat and said outer race peripheral surface being transversely crowned to present a convex surface into contact with said cam surface, thereby compensating for errors in parallelism between said cam surface and the axis of said bearing assembly.

4. A conduit embedding machine as defined in claim 3, one of said arms having an elongated slot therein having spaced parallel walls, said bearing assembly lying between said walls, said cam surface being mounted on one of said walls and said one arm carrying another cam surface parallel to said first-mentioned cam surface and spaced therefrom by a distance substantially equal to the diameter of said outer race, whereby said carrier is forcibly oscillated both forwardly and rearwardly.

5. A conduit embedding machine as defined in claim 4, said cam surfaces being of predetermined length and being arranged to be engaged by said bearing assembly when said knife is in ground engaging relation and being free of said bearing assembly when said carrier is in its raised position, said chassis carrying means for holding said arm out of contact with said bearing assembly in the raised position of said carrier.

6. A machine for embedding a flexible conduit or the like beneath the surface of the ground comprising a wheeled shaft having a first front drive wheel means and a second rear support wheel means, power means on said chassis for rotating said drive wheel means, a knife supporting carrier mounted on said chassis, said carrier having generally vertical arms disposed on each side of said chassis and a transverse stress bar connected between the lower ends of said arms and extending beneath said chassis between said front and rear wheel means, a vertically disposed knife and elongated tunnel-forming member secured to said stress bar intermediately of said arms, said carrier being pivotally mounted on said chassis for oscillatory movement about a horizontal axis and for generally vertical movement alternatively between a lower position in which said knife and tunnel-forming member are in ground engaging relation and an upper position in which said knife and tunnel-forming member are clear of the ground, said chassis having sufficient ground clearance to accommodate said stress bar in the upper position of said carrier, and power means for oscillating said carrier when it is in its lower position, said power means including a motor mounted on said chassis, said machine further comprising a transverse supporting bar affixed to said chassis forward of the axis of said front drive wheel means, the center of gravity of said machine lying behind the axis of said front drive wheel means when said rear wheel means is in contact with the ground and lying forward of said axis when the machine is tilted forwardly about said axis to bring said supporting bar into contact with the ground.

7. A machine for embedding a flexible conduit or the like beneath the surface of the ground comprising a wheeled shaft having a first front drive wheel means and a second rear support wheel means, power means on said chassis for rotating said drive wheel means, a knife supporting carrier mounted on said chassis, said carrier having generally vertical arms disposed on each side of said chassis and a transverse stress bar connected between the lower ends of said arms and extending beneath said chassis between said front and rear wheel means, a vertically disposed knife and elongated tunnel-forming member secured to said stress bar intermediately of said arm, said carrier being pivotally mounted on said chassis for oscillatory movement about a horizontal axis and for generally vertical movement alternatively between a lower position in which said knife and tunnel-forming member are in ground engaging relation and an upper position in which said knife and tunnel-forming member are clear of the ground, said chassis having sufficient ground clearance to accommodate said stress bar in the upper position of said carrier, and power means for oscillating said carrier when it is in its lower position, said power means including a power driven shaft transversely journalled in said chassis for rotation about a horizontal axis substantially parallel to and spaced from the pivot axis of said knife supporting carrier, an eccentric bearing assembly on said shaft and a cam surface on said knife supporting carrier positioned forwardly of said power driven shaft when said carrier is in its lower position, said cam surface being adapted to be engaged by said eccentric bearing assembly to force said knife supporting carrier forwardly against the resistance of the ground, and means for moving said carrier between its upper and lower positions, said cam surface being free of said eccentric bearing assembly when said carrier is in its upper position.

8. A conduit embedding machine as defined in claim 7, said eccentric bearing assembly comprising a roller bearing having an inner race and an outer race, said inner race being fixed eccentrically on said power driven shaft, the outer periphery of said outer race being adapted to engage said cam surface.

9. A machine for embedding flexible conduit or the like beneath the surface of the ground comprising a wheeled chassis having a first set of front drive wheels and a second set of rear support wheels, power means on said chassis for rotating said drive wheels, a knife supporting carrier mounted on said chassis, said carrier having a generally vertical arm disposed on each side of said chassis and a transverse stress bar connected between the lower ends of said arms and extending beneath said chassis between said wheels, a vertically disposed knife and tunnel-forming member secured to said stress bar intermediately of said arms, said carrier being pivotally mounted on said chassis for oscillatory movement about a horizontal axis and for generally vertical movement alternatively between a lower position in which said knife and tunnel-forming member are in ground engaging relation and an upper position in which said knife and tunnel-forming member are in ground engaging relation and an upper position in which said knife and tunnel-forming member are clear of the ground, said chassis having sufficient ground clearance to accommodate said stress bar in the upper position of said carrier, and power means for oscillating said carrier when it is in its lower position, said power means including a power driven shaft transversely journalled in said chassis for rotation about a horizontal axis substantially parallel to and spaced from the pivot axis of said knife supporting carrier, an eccentric bearing assembly on said shaft and a cam surface on said knife supporting carrier positioned forwardly of said power driven shaft when said carrier is in its lower position, said cam surface being adapted to be engaged by said eccentric bearing assembly to force said knife supporting carrier forwardly against the resistance of the ground, and means for moving said carrier between its upper and lower positions, said cam surface being free of said eccentric bearing assembly when said carrier is in its upper position, said eccentric bearing assembly comprising a roller bearing having an inner race and an outer race, said inner race being fixed eccentrically on said power driven shaft, the outer periphery of said outer race being adapted to engage said cam surface, said cam surface being flat and said outer race periphery being transversely crowned to present a convex surface to said cam surface, thereby compensating for lack of parallelism between said cam surface and the axis of said roller bearing.

10. A conduit embedding machine as defined in claim 9, further comprising another cam surface on said carrier parallel to said first-mentioned cam surface and spaced therefrom by a distance substantially equal to the outer diameter of said roller bearing outer race, whereby both said cam surfaces are in embracing relation to said roller bearing when said carrier is in its lower position.

11. A conduit embedding machine as defined in claim 10, further comprising means for holding said knife supporting carrier out of contact with said outer race when said carrier is in its upper position.

12. A conduit embedding machine as defined in claim 11, said roller bearing having lubricant passage means therein for supplying lubricant to the rollers thereof, said outer race having a radial lubricant passage for supplying lubricant to said cam surface.

13. A machine for embedding flexible conduit or the like beneath the surface of the ground comprising a chassis having a first set of front drive wheels and a second set of rear support wheels, a pair of vertically disposed, parallel journal plates on said chassis, a U-shaped knife supporting carrier having an arm disposed on each side of said chassis and a transverse stress bar connected between the lower ends of said arms and extending beneath said chassis between said wheels, a knife mounted on said stress bar adapted to enter the ground, an elongated tunnel-forming member fixedly carried at the lower end of said knife, flexible means extending rearwardly from said tunnel-forming member for connection to a conduit to draw said conduit therethrough, means for mounting said carrier on said chassis comprising a transverse axle journaled in the upper ends of said arms, said axle passing through a pair of elongated arcuate slots in said journal plates, and a lever pivotally connected to one of said journal plates for rotation about an axis coincident with the center of curvature of said slots, said transverse axle being journaled in said lever, means for forcibly oscillating said carrier comprising a power driven shaft journaled in said chassis and extending outwardly to each side thereof, an eccentric bearing assembly on each end of said shaft, each of said arms having an elongated opening therethrough, said eccentric bearing assemblies being disposed within said openings, said arms carrying parallel cam surfaces within said openings, said cam surfaces being spaced apart a distance substantially equal to the outer diameters of said eccentric bearing assemblies, said arcuate slots terminating at a location in a vertical plane above said power driven shaft and extending upwardly and forwardly therefrom, said cam surfaces being of such a length that they embrace said eccentric bearing assembly when said axle lies above said power driven shaft and are free of said bearing assembly when said lever is moved to pivot said carrier around the axis of said power driven shaft and simultaneously to move said axle upwardly and forwardly to raise said knife and tunnel-forming member out of ground engaging relation, said chassis being constructed to have sufficient clearance to accommodate said transverse stress bar, said knife and said tunnel-forming member when said carrier is in its raised position.

14. A conduit embedding machine as defined in claim 13, said machine further comprising a motor mounted on said chassis, means coupling said motor to said power driven shaft for rotating the same and means connected between said power driven shaft and said drive wheels for selectively transmitting power to said drive wheels to propel the machine forward over the surface of the ground.

15. A conduit embedding machine as defined in claim 14, said machine further comprising a transverse supporting bar fixed to said chassis forward of the axis of said front drive wheels, the center of gravity of said machine lying behind the axis of said front drive wheels when said rear wheels are in contact with the ground and lying forwardly of said axis when the machine is tilted forwardly to bring said supporting bar into contact with the ground.

16. A machine for embedding flexible conduit or the like beneath the surface of the ground comprising a chassis having a first set of front drive wheels and a second set of rear support wheels, a pair of vertically disposed, parallel journal plates on said chassis, a U-shaped knife supporting carrier having an arm disposed on each side of said chassis and a transverse stress bar connected between the lower ends of said arms and extending beneath said chassis between said wheels, a knife mounted on said stress bar adapted to enter the ground and draw a conduit therethrough, means for mounting said carrier on said chassis comprising a transverse axle journalled in the upper ends of said arms, said axle passing through a pair of elongated arcuate slots in said journal plates, and a lever pivotally connected to one of said journal plates for rotation about an axis coincident with the center of curvature of said slots, said transverse axle being journalled in said lever, means for forcibly oscillating said carrier comprising a power driven shaft journalled in said chassis and extending outwardly to each side thereof, an eccentric bearing assembly on each end of said shaft, each of said arms having an elongated opening therethrough, said eccentric bearing assemblies being disposed within said openings, said cam surfaces being spaced apart a distance substantially equal to the outer diameters of said eccentric bearing assemblies, said arcuate slots terminating at a location in a vertical plane above said power driven shaft and extending upwardly and forwardly therefrom, said cam surfaces, being of such a length that they embrace said eccentric bearing assembly when said axle lies above said power driven shaft and are free of said bearing assembly when said lever is moved to pivot said carrier around the axis of said power driven shaft and simultaneously to move said axles upwardly and forwardly to raise said knife out of ground engaging relation, said chassis being constructed to have sufficient clearance to accommodate said transverse stress bar and said knife when said carrier is in its raised position, said cam surfaces being flat and the outer peripheries of said eccentric bearing assemblies being transversely crowned to present convex surfaces to said cam surfaces thereby compensating for lack of parallelism between said cam surfaces and the axis of said bearing assemblies.

17. A conduit embedding machine as defined in claim 16, each of said eccentric bearing assemblies comprising a needle roller bearing having an inner race and an outer race, said inner race being fixed eccentrically on said power driven shaft, said cam surfaces being flat and the outer periphery of said outer race being transversely crowned to present a convex surface to said cam surfaces thereby compensating for lack of parallelism between said cam surfaces and the axis of said bearing assemblies.

18. A conduit embedding machine as defined in claim 17, said roller bearings having lubricant passage means therein for supplying lubricant to the rollers thereof, each outer race having at least one radial lubricant passage for supplying lubricant to said cam surfaces.

References Cited

UNITED STATES PATENTS

| | | | |
|---|---|---|---|
| 2,702,502 | 2/1955 | Rogneby | 172—19 |
| 2,868,094 | 1/1959 | Anderson | 94—48 |
| 2,905,253 | 9/1959 | Ditter | 172—40 X |
| 2,949,871 | 8/1960 | Finn. | |
| 3,201,948 | 8/1965 | Schramm | 61—72.6 |
| 3,201,944 | 8/1965 | Christensen | 61—72.7 X |
| 3,211,236 | 10/1965 | Patton | 172—40 |

EARL J. WITMER, *Primary Examiner.*